(12) United States Patent
Hall et al.

(10) Patent No.: US 6,891,899 B2
(45) Date of Patent: May 10, 2005

(54) SYSTEM AND METHOD FOR BIT ENCODING TO INCREASE DATA TRANSFER RATE

(75) Inventors: Stephen H. Hall, Hillsboro, OR (US); Michael W. Leddige, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 839 days.

(21) Appl. No.: 09/810,576

(22) Filed: Mar. 19, 2001

(65) Prior Publication Data

US 2002/0131518 A1 Sep. 19, 2002

(51) Int. Cl.[7] .......... H04L 27/04; H04L 27/12; H04L 27/20

(52) U.S. Cl. ........................... 375/295

(58) Field of Search .................. 375/286, 295

(56) References Cited

U.S. PATENT DOCUMENTS 5,243,628 A * 9/1993 Moritoki et al. ............ 375/286

* cited by examiner

*Primary Examiner*—Stephen Chin
*Assistant Examiner*—Curtis Odom
(74) *Attorney, Agent, or Firm*—Jeffrey B. Huter (57) ABSTRACT

A system and method for increasing data transfer rate is disclosed. A digital signal waveform that contains one bit of information for every bit time of the digital signal waveform is received. Every three bits of the digital signal waveform is buffered and encoded. The encoding produces an encoded waveform that contains three bits of information for each bit time of the digital signal waveform, therefore, increasing the data transfer rate of the digital signal waveform.

27 Claims, 5 Drawing Sheets

SYSTEM AND METHOD FOR BIT ENCODING TO INCREASE DATA TRANSFER RATE

BACKGROUND

1. Field

This invention relates to data transfers between devices, and more specifically to bit encoding to increase the data transfer rate between devices.

2. Background

As bus speeds continue to increase, traditional methods of bus design become problematic due to fundamental physical limitations associated with the printed circuit boards (PCB), sockets, chip packages and component sockets. The electrical and physical variations associated with these technologies are too large to facilitate the required control of the timing and signal integrity of digital waveforms as they propagate from one component to another. The harmonics (frequency content of digital signals) of modern day digital waveforms are so high, today's low cost technologies (e.g., PCBs, sockets, chip packages, etc.) cannot support these high frequencies. Higher harmonics in signals cause an increase in distortion in high speed systems. As bus speeds continue to increase, timing and signal quality aberrations due to the interconnections become primary performance inhibitors. Increased distortion can cause a digital waveform signal to be indistinguishable at a receiver between a zero level and a one level, or the signal to arrive at a receiver at the wrong time. Therefore, as digital waveforms signal harmonics increase, the digital waveforms are severally distorted as they propagate from one component to another, and overall system performance is significantly jeopardized. Therefore, there is a need for a system and method for increasing data rates of digital waveforms without dramatically increasing the frequency content of the digital waveforms thereby minimizing distortion.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments (e.g., servers).

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention relates to systems and methods for bit encoding to increase data transfer rate that includes receiving a digital signal waveform with one bit of information per bit time, and encoding this digital signal for subsequent transfer. The encoding produces an encoded waveform that includes three bits of information per bit time. Therefore, the data transfer rate of the digital signal waveform is increased.

Figure 1:
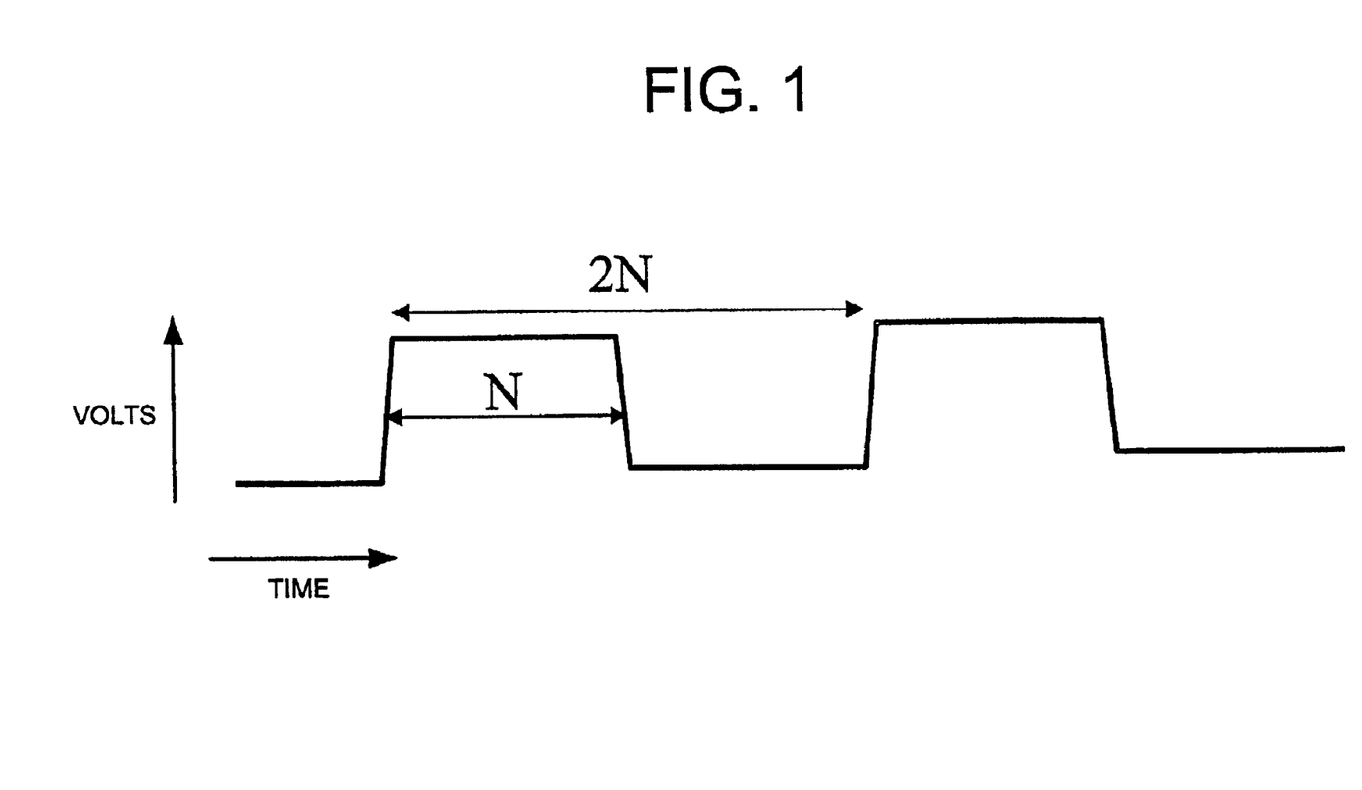
FIG. 1 is a diagram of an example digital signal waveform.

FIG. 1 shows a diagram of an example digital signal waveform. The vertical axis is voltage and the horizontal axis is time. The digital waveform has a pulse width of N and a period (or cycle) of 2N where N represents the bit time of the pulse (i.e., the time during which information is transferred). The pulse width, N, may be in any of many units of time such as nanoseconds, microseconds, picoseconds, etc. The maximum data rate that may be transmitted in this manner is 1/N transfers per second, or one bit of data per half cycle (the quantity of time labeled N). The fundamental frequency of the digital waveform is 1/2N hertz.

Figure 2:
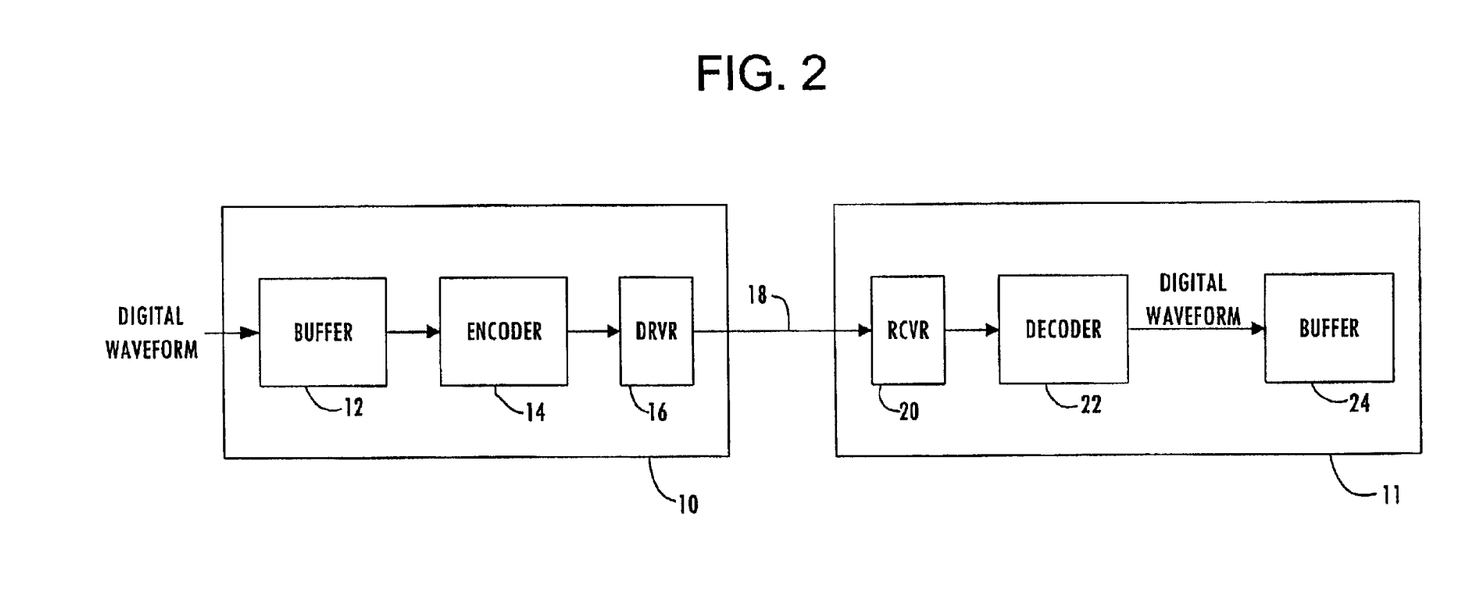
FIG. 2 is a block diagram of an example system for increasing data transfer rate according to an example embodiment of the present invention.

FIG. 2 shows a block diagram of an example system for increasing data transfer rate according to an example embodiment of the present invention. In systems and methods according to the present invention, more data per bit time may be sent such that the data transfer rate between one device 10 and a second device 11 increases without significantly increasing the harmonic frequency content of the digital waveform transferred. A digital waveform may be received by one or more buffers 12 at a device 10. Buffer 12 buffers or stores three bits of the digital waveform at a time. The buffered three bits may then be sent to an encoder 14. Based on the pattern or values of the buffered three bits of the digital waveform, encoder 14 generates an encoded waveform that includes two equal sections for every bit time (i.e., N) whereby three bits of information are included in a bit time of the encoded waveform. The encoded waveform may then be sent to one or more drivers 16 of first device 10.

The encoded waveform may then be sent from device 10 across a transmission medium 18 (e.g., cable, wire, bus, etc.) to a second device 11. One or more receivers 20 at device 11 may receive the encoded waveform and transfer it to a decoder 22 where the encoded waveform may be decoded into the original digital waveform. This original digital waveform may then be sent to a buffer 24. The encoding in device 10 provides an increased data rate for the information transferred across transmission medium 18 to device 11.

Figure 3:
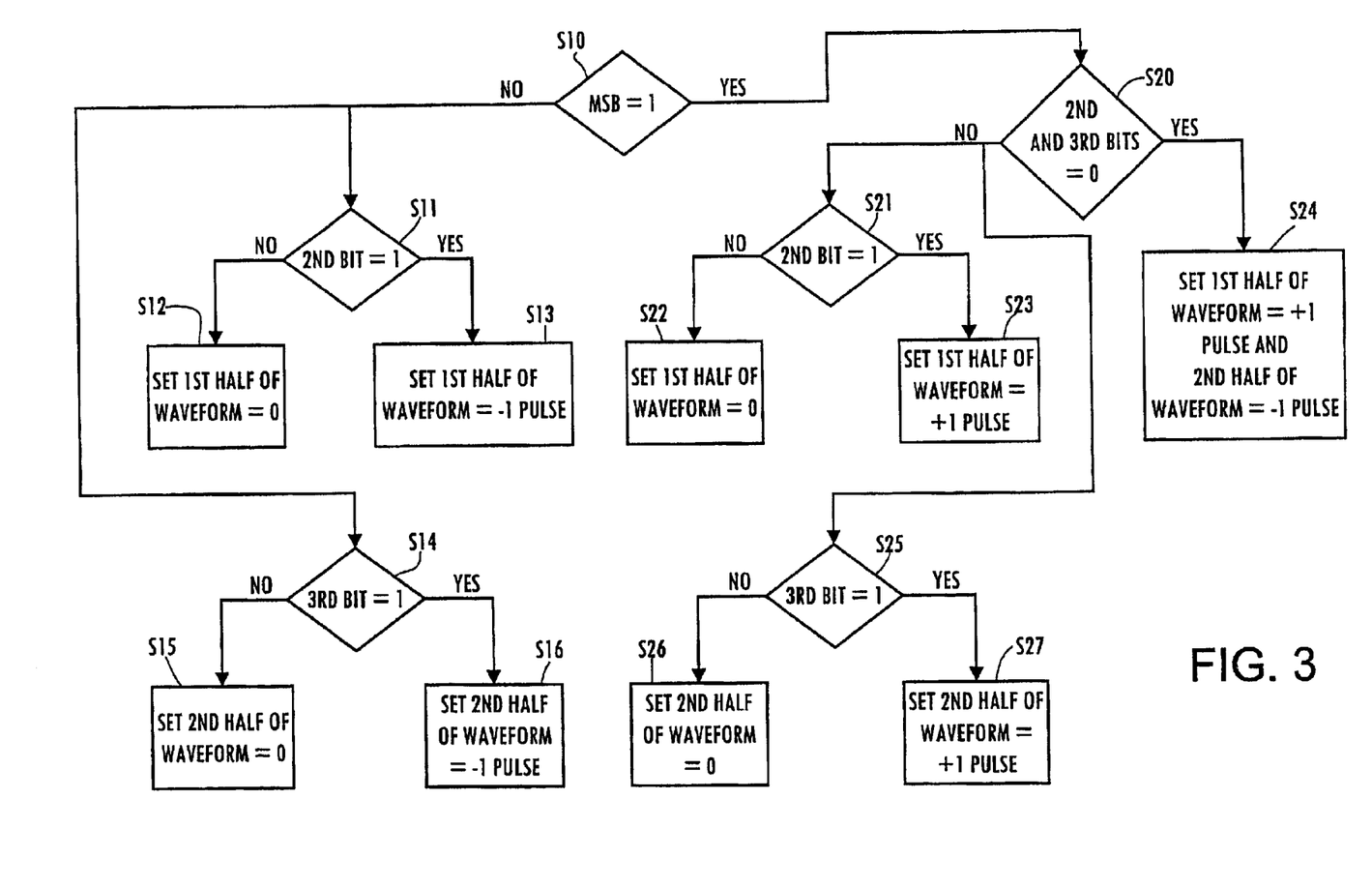
FIG. 3 is a flowchart of an example encoding process according to an example embodiment of the present invention.

FIG. 3 shows a flowchart of an example encoding process according to an example embodiment of the present invention. Depending on the values of the buffered three bits, an encoder generates an encoded waveform that contains a +1 pulse, −1 pulse, or zero level in a first half or second half of a bit time of the digital signal. When an encoder receives the buffered three bits of a digital waveform, it is first determined if the most significant bit (MSB) of the three bits is equal to '1' S10. If the most significant bit is not equal to '1', the second bit may be checked to determine if it is equal to '1', S11. If the second bit is not equal to '1', the encoder may generate the first half of the bit time of the encoded waveform to be equal to '0', S12. If the second bit is equal to '1', the encoder may generate a −1 pulse for the first half of the bit time of the encoded waveform S13. Further, if the most significant bit is not equal to '1', the third bit may be checked to determine if it is equal to '1', S14. If the third bit is not equal to '1', the encoder may generate the second half of the bit time of the encoded waveform to be equal to zero S15. If the third bit is equal to '1', the encoder may generate a −1 pulse for the second half of the bit time of the encoder waveform S16.

If the most significant bit of the buffered three bits of the digital waveform is '1', the second and third bits of the digital waveform may be checked to determine if they are equal to a zero, S20. If the second and third bits are equal to a zero, the encoder may generate a +1 pulse for the first half of the bit time of the encoded waveform and a −1 pulse for the second half of the bit time of the encoded waveform S24. If the second and third bits of the digital waveform are not equal to zero, the encoder may determine if the second bit is equal to '1', S21. If the second bit is not equal to '1', the encoder may generate a zero level for the first half of the bit time of the encoded waveform S22. If the second bit is equal to '1', the encoder may generate a +1 pulse for the first half of the bit time of the encoded waveform S23. Further, if the MSB is equal to '1', and the second and third bits are not equal to zero, the encoder may determine if the third bit is equal to '1', S25. If the third bit is not equal to '1', the encoder may generate a zero for the second half of the bit time of the encoded waveform, S26. If the third bit is equal to '1', the encoder may generate a +1 pulse during the second half of the bit time of the encoded waveform S27.

Therefore, an encoder according to the present invention divides the bit time of a digital signal waveform into two equal sections, each section being N/2 in duration. The encoded waveform outputted from the encoder effectively may appear to be a shape modulation of the input digital waveform. However, the encoded waveform provides an increase in the transfer rate since three bits of information are now available in the encoded waveform during a bit time of the digital waveform as opposed to one bit of information during a bit time of the digital waveform.

Figure 4:
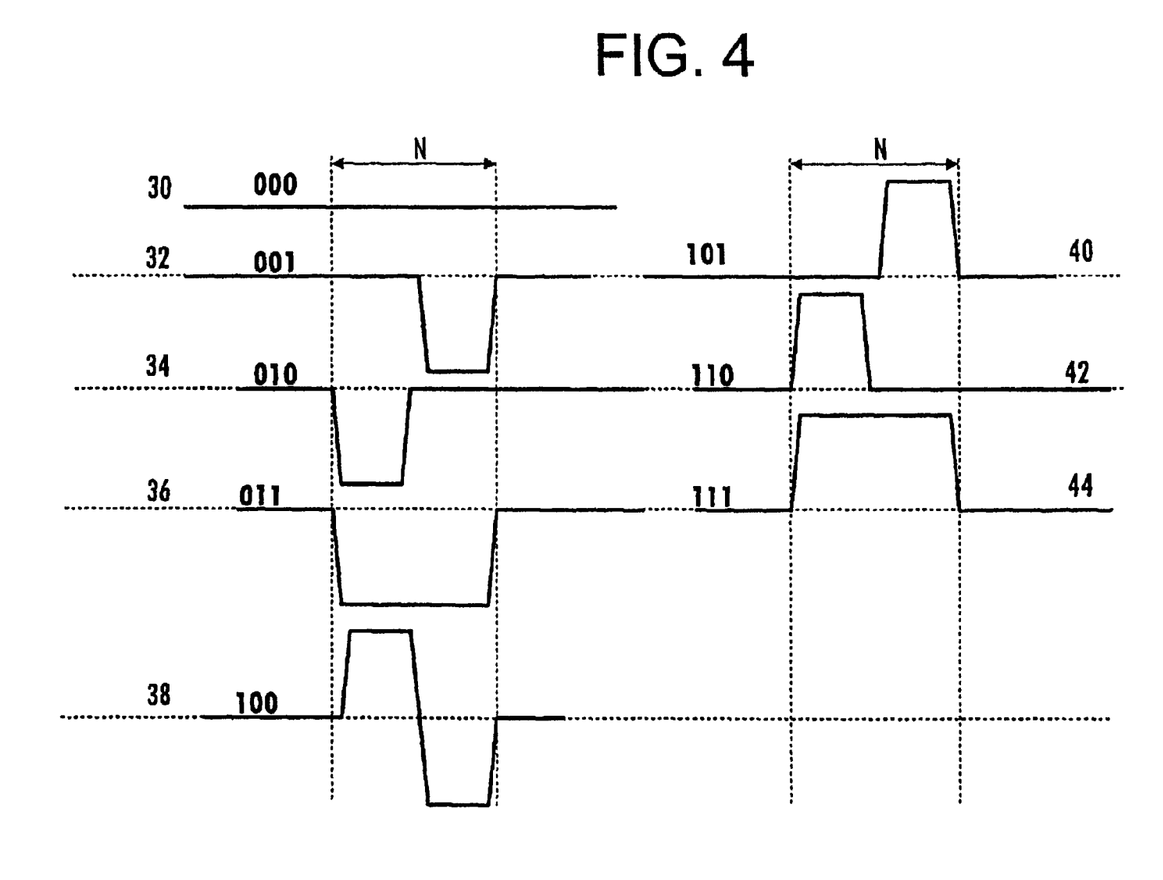
FIG. 4 is a diagram of example encoded waveforms according to an example embodiment of the present invention.

FIG. 4 shows a diagram of example encoded waveforms according to an example embodiment of the present invention. All possible combination of values for three bits of a digital waveform along with the encoded waveform for each combination is shown. In FIG. 4, the values of the three bits of the digital waveform are shown to the left of the associated encoded waveform. Each encoded waveform consists of two equal parts during bit time N.

Waveform 30 shows that three bits of a digital signal waveform that equal "000" may be encoded into an encoded waveform that consists of a first half at a zero signal and a second half at a zero signal during a bit time N. Waveform 32 shows that a digital waveform with three bits equal to "001" may be encoded into an encoded waveform that includes a first half at a zero level and a second half being a −1 pulse. Waveform 34 shows that a digital waveform with three bits equal to "010" may be encoded into an encoded waveform of a −1 pulse in the first half and a 0 level as the second half. Waveform 36 shows that a digital waveform with three bits equal to "011" may be encoded into an encoded waveform that consists of a −1 pulse during the first half of the bit time followed by a −1 pulse during the second half. Waveform 38 shows that a digital waveform with three bits equal to "100" may be encoded into an encoded waveform that consists of a +1 pulse during the first half of the bit time followed by a −1 pulse during the second half. Waveform 40 shows that a digital waveform with three bits equal to "101" may be encoded into an encoded waveform that consists of a zero level during the first half of a bit time followed by a +1 pulse during the second half. Waveform 42 shows that a digital waveform with three bits equal to "110" may be encoded into an encoded waveform that includes a +1 pulse during a first half of the waveform and a zero level during the second half. Further, waveform 44 shows that a digital waveform with three bits equal to "111" may be encoded into an encoded waveform that includes a +1 pulse during both the first half and the second half of a bit time of the digital waveform.

Therefore, an encoder according to the present invention may use three levels, a zero level, a −1 pulse, and a +1 pulse to encode three bits of a digital signal waveform. The amplitudes of the −1 pulses and the +1 pulses may be any voltage level so long as they are distinguishable from other levels. Further, the encoder waveform may be generated by an encoder using any of many possible combinations of electronic devices and circuits, e.g., logic gates, comparators, decoders, pulse generators, signal generators, wave shapers, etc. and still be within the spirit and scope of the present invention.

Therefore, in system and methods according to the present invention, the amount of data transmitted per cycle is increased thus resulting in a net increase in the transfer rate. However, in order to further evaluate the gains of encoding a digital waveform according to the present invention, it may be necessary to normalize the increased data rate to the maximum fundamental frequency transmitted across the transmission medium. This normalization will be illustrated by comparing a conventional digital waveform, (i.e., that shown in FIG. 1), with an encoded waveform, e.g., waveforms 38 and 40 in sequence (i.e., '100101') shown in FIG. 4. First, looking at the conventional digital waveform of FIG. 1, one bit of data is transferred during a time of N seconds. A bit pattern of "10" may transmitted during the period 2N where the "1" is transferred during the first half of the period and the "0" is transferred during the second half of the period. If we call the conventional case, case A, the bandwidth is equal to 1 bit/N seconds. Now looking at the encoded case, which we shall call case B for illustration, three bits of data is transferred in N seconds. Assuming a bit pattern as noted previously, of "100101", the bandwidth of case B is equal to three bits/N seconds. The Fourier harmonic content of case B is twice that of case A. This can be seen by looking at the fundamental frequency, where the fundamental frequency of case A is equal to 1/2N, and the fundamental frequency for case B is equal to 1/N. The goal is to determine the bandwidth normalized to the harmonic frequency content. Looking at case A, the normalized bandwidth is equal to 1/N bits per second divided by the fundamental frequency for case A. This is equal to (1/N bits per second)/(1/2N seconds). Solving this fraction for case A, the bandwidth normalized to the harmonic content is equal to 2.

Now looking at case B, the normalized bandwidth is equal to 3/N bits per second divided by the fundamental frequency of B. This is equal to (3/N)/(1/N). Therefore, for case B (the encoded waveform) the bandwidth normalized to the harmonic content is equal to 3. Thus, the normalized bandwidth of case B is 50% larger than the normalized bandwidth of case A.

If simultaneous bidirectional signaling technology is used, methods and systems according to the present invention may yield a 100% increase in the normalized data rate. Moreover, by using multi-level logic, for example, 1, 1/2, and 0, extra bits may be encoded. However, this may eliminate the use of simultaneous bidirectional signaling techniques, and also may be problematic with low signal swings and significant system noise as is normally seen in modern buses.

Figure 5:
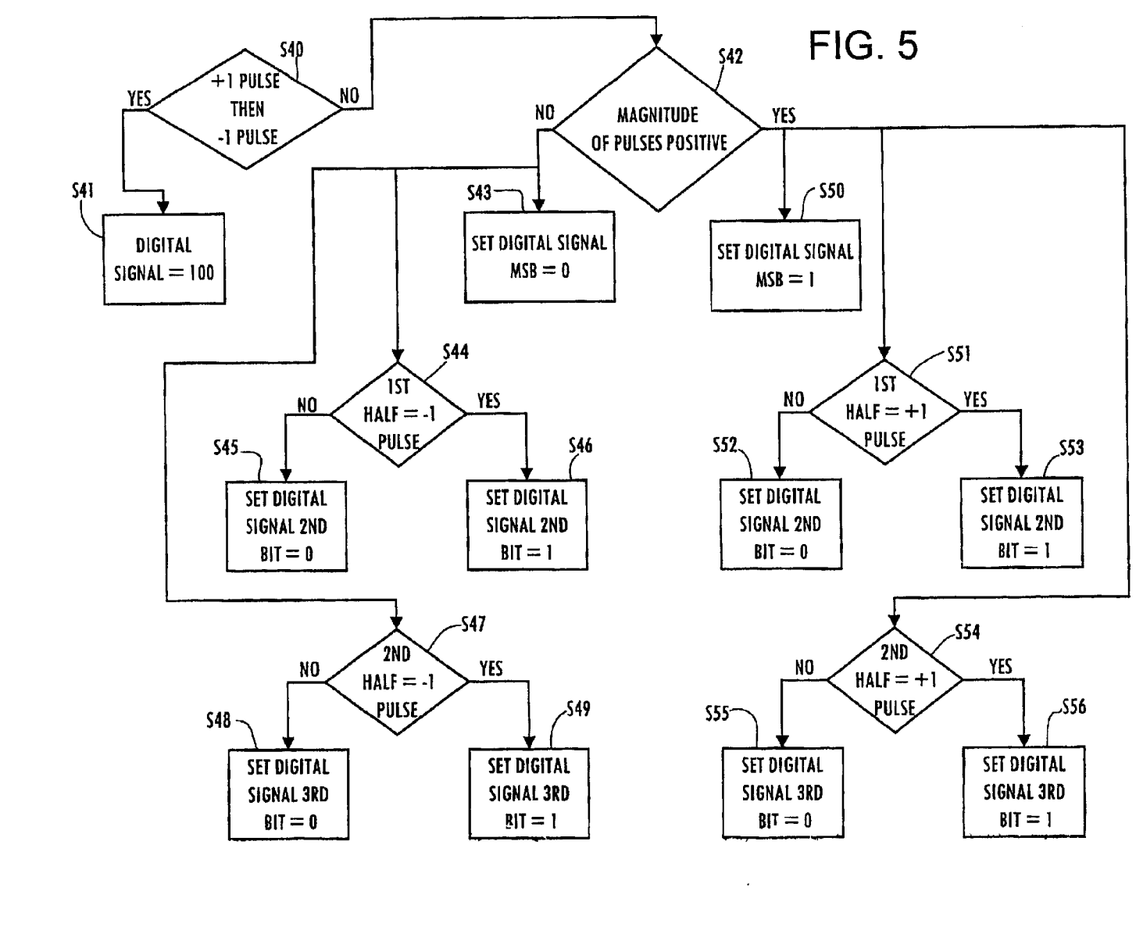
FIG. 5 is a flowchart of an example decoding process according to an example embodiment of the present invention.

FIG. 5 shows a flowchart of an example decoding process according to an example embodiment of the present invention. A decoder receives an encoded waveform and examines the first half and the second half signals during a bit time to determine the appropriate decoding. The encoder determines if the first half is equal to a +1 pulse and the second half is equal to a −1 pulse S40. If a +1 pulse followed by a −1 pulse is received, the decoder decodes this waveform into a digital signal equal to "00" S41. If the first half of the bit time does not have a +1 pulse and the second half a −1 pulse, the decoder checks to determine the magnitude of the sum of the pulses in the first half and the second half taken together. The decoder determines if the magnitude of the sum of the pulses is positive S42. If the magnitude of the pulses is not positive, the decoder sets the most significant bit of the digital signal equal to zero S43. Further, if the magnitude of the pulses is not positive, the decoder checks the first half of the bit time (N) to determine if the encoded waveform is a −1 pulse S44, and if not, the decoder sets the second bit of the digital signal equal to '0' S45. If the first half waveform is a −1 pulse, the decoder sets a second bit of the digital signal equal to '1' S46. Similarly, if the magnitude of the pulses is not positive, the decoder checks the second half of the encoded waveform to determine if the encoded waveform has a −1 pulse S47, and if not, the decoder sets the third bit of the digital signal equal to '0' S48. If the second half of the waveform is equal to a −1 pulse, the decoder sets the third bit of the digital signal equal to '1' S49.

If the decoder determines that the magnitude of the pulses in an encoded waveform, during a bit time, taken together is positive, the decoder sets the most significant bit of the digital signal equal to '1', S50. Further, the decoder checks the first half of the encoded waveform to determine if it is a +1 pulse, S51, and if not, the decoder sets the second bit of the digital signal equal to '0' S52. If the first half of the waveform is a +1 pulse, the decoder sets the second bit of the digital signal equal to '1' S53. Moreover, if the magnitude of the pulses is positive, the decoder checks the second half of the encoded waveform to determine if it is equal to a +1 pulse S54, and if not, the decoder sets the third bit of the digital signal equal to '0' S55. If the second half of the encoded waveform is equal to a +1 pulse, the decoder sets the third bit of the digital signal equal to '1' S56.

Circuits for encoding and decoding according to the present invention may include any of many circuit designs and/or electronic devices. The decoding circuits may use some delay circuits and strobe edge paths such that each N/2 section may be clocked in separately, or in the alternative, a rising strobe edge may clock in the first N/2 section and a falling strobe edge may clock in the second. Comparator circuits may be used to detect the polarity or magnitude of both N/2 sections so that the most significant bit may be set appropriately.

System and methods for bit encoding to increase data transfer rate according to the present invention are advantageous in that a 50% increase in bus speed is provided when normalized to the frequency content present on the interconnects. Thus, the system cost may be decreased by delaying the requirement for new expensive interconnect technology. Further, some of the primary performance limiters of computer systems at the platform level may be circumvented. Moreover, the data rate of digital waveforms may be increased without dramatically increasing the frequency content of the digital waveforms thereby minimizing distortion.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A system for increased data transfer rate comprising:
   at least one buffer, the at least one buffer receiving a digital signal waveform, the digital signal waveform containing one bit of information for every bit time of the digital signal waveform, the at least one buffer buffering every three bits of the digital signal waveform; and
   an encoder, the encoder encoding every buffered three bits of the digital signal waveform producing an encoded waveform that contains three bits of information for each bit time of the digital signal waveform, the encoding increasing the data transfer rate of the digital signal waveform.

2. The system according to claim 1, further comprising a decoder, the decoder decoding the encoded waveform producing three bits of the digital signal waveform containing one bit of information for every bit time of the digital signal waveform.

3. The system according to claim 2, further comprising a second buffer, the second buffer receiving the digital signal waveform produced from the decoder.

4. The system according to claim 1, further comprising at least one driver device operably connected to the encoder and at least one receiver device operably connected to a decoder, the at least one driver device transferring the encoded waveform across a transmission medium to the at least one receiver.

5. The system according to claim 1, wherein the buffered three bits of the digital signal waveform are '000', the encoded waveform comprising two sections where a first section is at a zero level and a second section is at a zero level.

6. The system according to claim 1, wherein the buffered three bits of the digital signal waveform comprise '001', the encoded waveform comprising two sections where a first section is at a zero level and a second section is a negative pulse.

7. The system according to claim 1, wherein the buffered three bits of the digital signal waveform comprise '010', the encoded waveform comprising two sections where a first section is a negative pulse and a second section is at a zero level.

8. The system according to claim 1, wherein the buffered three bits of the digital signal waveform comprise '011', the encoded waveform comprising two sections where a first section is a negative pulse and a second section is a negative pulse.

9. The system according to claim 1, wherein the buffered three bits of the digital signal waveform comprise '100', the encoded waveform comprising two sections where a first section is a positive pulse and a second section is at a negative pulse.

10. The system according to claim 1, wherein the buffered three bits of the digital signal waveform comprise '101', the encoded waveform comprising two sections where a first section is at a zero level and a second section is a positive pulse.

11. The system according to claim 1, wherein the buffered three bits of the digital signal waveform comprise '110', the encoded waveform comprising two sections where a first section is a positive pulse and a second section is at a zero level.

12. The system according to claim 1, wherein the buffered three bits of the digital signal waveform comprise '111', the encoded waveform comprising two sections where a first section is a positive pulse and a second section is a positive pulse.

13. A method for increasing data transfer rate comprising:
receiving a digital signal waveform, the digital signal waveform containing one bit of information for every bit time of the digital signal waveform;
buffering the digital signal waveform three bits at a time;
encoding each buffered three bits of the digital signal waveform producing an encoded waveform of the buffered three bits of the digital signal waveform that contains three bits of information for each bit time of the digital signal waveform, the encoding increasing the data transfer rate of the digital signal waveform.

14. The method according to claim 13, further comprising sending the encoded waveform from a first device to a second device across a transmission medium.

15. The method according to claim 14, further comprising:
receiving the encoded waveform at the second device;
decoding the encoded waveform at the second device, the decoding producing three bits of the digital signal waveform containing one bit of information for every bit time of the digital signal waveform.

16. The method according to claim 13, wherein the buffered three bits of the digital signal waveform comprise '000', the encoded waveform comprising two sections where a first section is at a zero level and a second section is at a zero level.

17. The method according to claim 13, wherein the buffered three bits of the digital signal waveform comprise '001', the encoded waveform comprising two sections where a first section is at a zero level and a second section is a negative pulse.

18. The method according to claim 13, wherein the buffered three bits of the digital signal waveform comprise '010', the encoded waveform comprising two sections where a first section is a negative pulse and a second section is at a zero level.

19. The method according to claim 13, wherein the buffered three bits of the digital signal waveform comprise '011', the encoded waveform comprising two sections where a first section is a negative pulse and a second section is a negative pulse.

20. The method according to claim 13, wherein the buffered three bits of the digital signal waveform comprise '100', the encoded waveform comprising two sections where a first section is a positive pulse and a second section is a negative pulse.

21. The method according to claim 13, wherein the buffered three bits of the digital signal waveform comprise '101', the encoded waveform comprising two sections where a first section is at a zero level and a second section is a positive pulse.

22. The method according to claim 13, wherein the buffered three bits of the digital signal waveform comprise '110', the encoded waveform comprising two sections where a first section is a positive pulse and a second section is at a zero level.

23. The method according to claim 13, wherein the buffered three bits of the digital signal waveform comprise '111', the encoded waveform comprising two sections where a first section is a positive pulse and a second section is a positive pulse.

24. A method for encoding comprising at least one of:
encoding three bits comprising '000' of a digital signal waveform into an encoded waveform comprising two sections where a first section is at a zero level and a second section is at a zero level;
encoding three bits of a digital signal waveform comprising '001' into an encoded waveform comprising two sections where the first section is at a zero level and the second section is a negative pulse;
encoding three bits of a digital signal waveform comprising '010' into an encoded waveform comprising two sections where the first section is a negative pulse and the second section is at a zero level;
encoding three bits of a digital signal waveform comprising '011' into an encoded waveform comprising two sections where the first section is a negative pulse and the second section is a negative pulse;
encoding three bits of a digital signal waveform comprising '100' into an encoded waveform comprising two sections where the first section is a positive pulse and the second section is a negative pulse;
encoding three bits of a digital signal waveform comprising '101' into an encoded waveform comprising two sections where the first section is at a zero level and the second section is a positive pulse;
encoding three bits of a digital signal waveform comprising '110' into an encoded waveform comprising two sections where the first section is a positive pulse and the second section is at a zero level; and encoding three bits of a digital signal waveform comprising '111' into an encoded waveform comprising two sections where the first section is a positive pulse and the second section is a positive pulse, and wherein the encoding increases the data transfer rate of the digital signal waveform.

25. The method according to claim 24, further comprising buffering each three bits of the digital signal waveform before the encoding.

26. A method for decoding comprising at least one of:

decoding an encoded waveform comprising two sections where a first section is at a zero level and a second section is at a zero level into three bits of a digital signal waveform comprising '000';

decoding an encoded waveform comprising two sections where the first section is at a zero level and the second section is a negative pulse into three bits of a digital signal waveform comprising '001';

decoding an encoded waveform comprising two sections where the first section is a negative pulse and the second section is at a zero level into three bits of a digital signal waveform comprising '010';

decoding an encoded waveform comprising two sections where the first section is a negative pulse and the second section is a negative pulse into three bits of a digital signal waveform comprising '011';

decoding an encoded waveform comprising two sections where the first section is a positive pulse and the second section is a negative pulse into three bits of a digital signal waveform comprising '100';

decoding an encoded waveform comprising two sections where the first section is at a zero level and the second section is a positive pulse into three bits of a digital signal waveform comprising '101';

decoding an encoded waveform comprising two sections where the first section is a positive pulse and the second section is at a zero level into three bits of a digital signal waveform comprising '110', and decoding an encoded waveform comprising two sections where the first section is a positive pulse and the second section is a positive pulse into three bits of a digital signal waveform comprising '111'.

27. The method according to claim 26, further comprising buffering each three bits of the digital signal waveform after the decoding.

* * * * *